July 10, 1962 J. M. STUCKEY 3,043,891
SEPARATION OF HYDROCARBONS
Filed Oct. 29, 1954
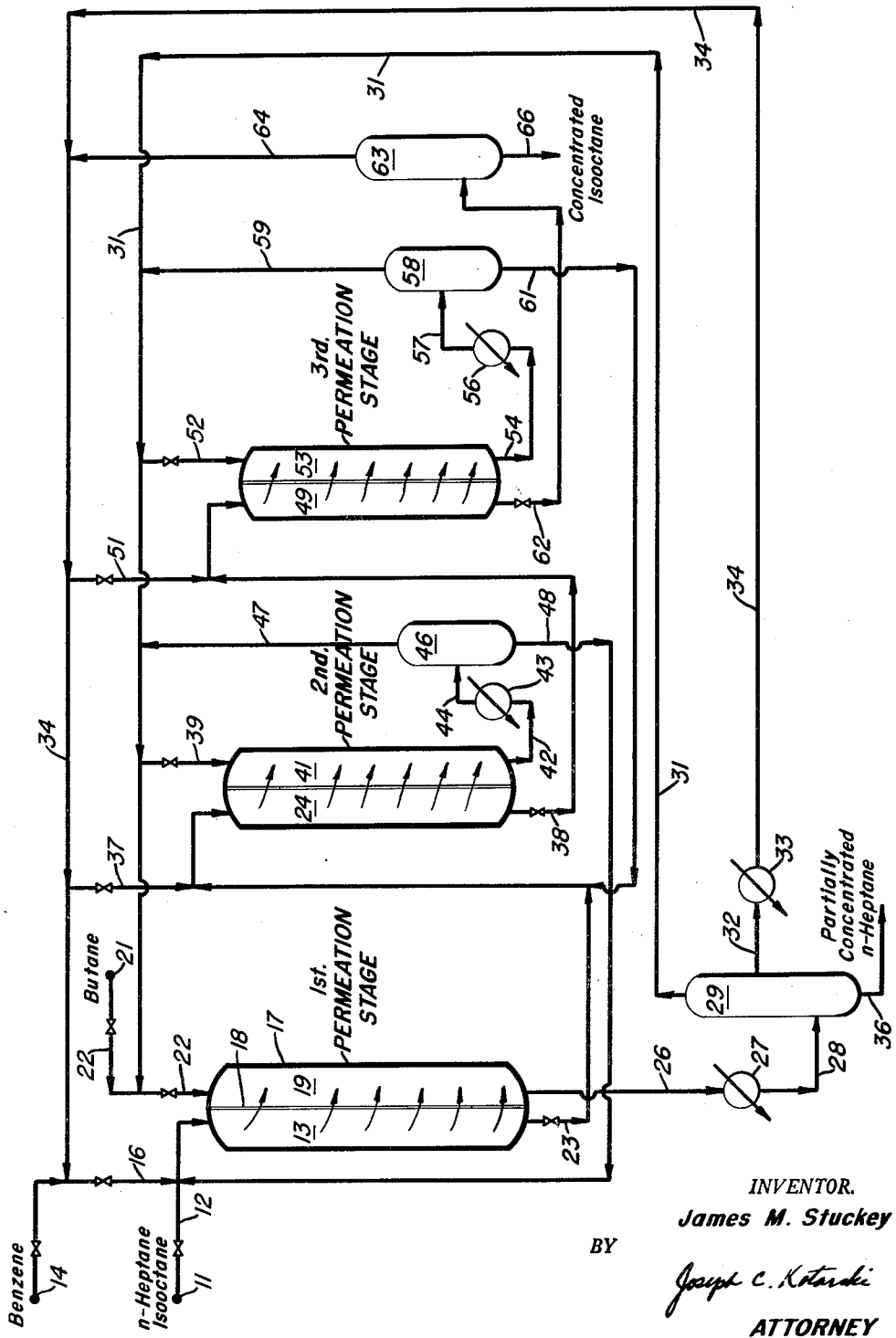
INVENTOR.
James M. Stuckey
BY
Joseph C. Kotarski
ATTORNEY

3,043,891
SEPARATION OF HYDROCARBONS
James M. Stuckey, Texas City, Tex., assignor, by mesne assignments, to Standard Oil Company, Chicago, Ill., a corporation of Indiana
Filed Oct. 29, 1954, Ser. No. 465,495
10 Claims. (Cl. 260—674)

This invention relates to an improvement in the separation of certain hydrocarbons from mixtures thereof with other hydrocarbons by permeation through a non-porous membrane and it pertains more particularly to improved methods and means for effecting separation of saturated hydrocarbons from hydrocarbon mixtures which would normally have low permeation rates.

It has been known that certain hydrocarbons could be separated from hydrocarbon mixtures by permeation through non-porous membranes of natural rubber, chloroprene, styrene polymer and the like but the permeation rates of hydrocarbons through such membranes were so low that the processes were commercially impracticable. As described and claimed in copending applications certain types of cellulose ester membranes (Serial No. 443,894, Patent No. 2,930,754) and certain types of cellulose ether membranes (Serial Nos. 443,893 and 443,895, Patent Nos. 2,958,656 and 2,958,657) are remarkably effective for separating hydrocarbons according to type, and/or molecular configuration, and/or boiling point. Even with these improved non-porous membranes the permeation rates of saturated hydrocarbons may be too low for practicable purposes; for example, normal heptane may be separated from a mixture thereof with isooctane but such separation is impracticable because of the very low permeation rate. An object of this invention is to provide an improved method and means for increasing the permeation rate of saturated hydrocarbons through non-porous membranes which are capable of separating hydrocarbons according to type, and/or molecular configuration, and/or boiling point or molecular weight. A more specific object is to provide a method and means for separating gasoline boiling range hydrocarbon mixtures which are lean in aromatics and unsaturated hydrocarbons into fractions of high and low octane number, respectively, at such rates of permeation as to make the process commercially feasible. Other objects will be apparent in the course of the detailed description of the invention.

It has been discovered that when a hydrocarbon mixture comprised essentially of saturated hydrocarbons is permeated through a non-porous membrane, in which certain of the hydrocarbons contained in the mixture are more soluble than others, for the purpose of separating the mixture into different components, the rate of permeation can be enormously increased by contacting the membrane during the permeation process with an added hydrocarbon solvent for the membrane. The hydrocarbon solvent may be an aromatic or unsaturated hydrocarbon such as an olefin or diolefin. The solvent preferably has a low boiling point. Aromatics such as benzene, toluene or xylene, which are preferred in the order named, and unsaturates such as isoprene, hexadiene, cyclopentadiene, hexene, heptene, and the like may be used to improve the rate of permeation without substantially altering the selectivity or separation factor. The diolefins and olefins exert a similar but somewhat lesser effect respectively, than do the aromatic hydrocarbons. The hydrocarbon solvent may contact the membrane either on the feed side, the permeate side, or both sides. It may be employed in the liquid or vapor phase. Preferably, the hydrocarbon solvent is added to the hydrocarbon mixture which is undergoing permeation. The amount of hydrocarbon solvent which may be employed will vary from about 5 to about 100% by concentration based upon the total hydrocarbons present in the zone to which the hydrocarbon solvent is added. The particular amount used will depend upon the improvement in the rate of permeation desired, the particular hydrocarbon solvent employed, the nature of the membrane, operating conditions employed in the permeation process etc. Higher concentrations of the hydrocarbon solvent cause greater improvements in the rate of permeation, but the concentration of the hydrocarbon solvent should not be so high as to dissolve or weaken the membrane to the point of rupture under the operating conditions employed in the permeation process. For example, when an aromatic hydrocarbon such as toluene is added to a mixture of normal heptane and isooctane so that the toluene is contained in the mixture in a concentration of 25%, the permeation rate is increased more than twenty-fold by the addition of the hydrocarbon solvent.

The method of separating materials by selective permeation through non-porous membranes has heretofore been described in the art. Copending applications Serial Nos. 443,893–4–5 set forth in detail the manner in which hydrocarbons can be separated by permeation through non-porous membranes. Briefly, a mixture of hydrocarbons is contacted with one side (feed side) of a thin (e.g. 0.1 to 10 mils) non-porous membrane in which certain of the hydrocarbons contained in the feed mixture are more soluble (preferentially permeatable) than others, a portion of the hydrocarbon mixture is permeated through the membrane, and permeated hydrocarbons which are enriched in those hydrocarbons more soluble in the membrane are recovered from the opposite side (permeate side) of the membrane. In practice, each separation stage comprises a vessel which is divided by the non-porous membrane into a feed zone for feed hydrocarbons and a permeate zone containing permeated hydrocarbons, each zone having separate draw-offs. In order for permeation to occur it is essential that the concentration of the preferentially permeatable hydrocarbons in contact with the membrane in the permeate zone be less than the concentration of such hydrocarbons in contact with the membrane in the feed zone. Under such conditions a portion of the feed hydrocarbons dissolve within the membrane and permeate therethrough. The permeated hydrocarbons can then be removed from the permeate side of the membrane as a mixture of the original hydrocarbon components but having a higher concentration (based upon total hydrocarbons permeated) of the preferentially permeatable hydrocarbons than the concentration of the preferentially permeatable hydrocarbons present in the initial hydrocarbon mixture employed as feed. The remaining non-permeated hydrocarbons present in the feed zone will have a lower concentration of the preferentially permeated hydrocarbons than was present in the feed and a lower concentration of these components than is present in the mixture of permeated hydrocarbons. Conversely, the remaining non-permeated hydrocarbons will be enriched in those hydrocarbons which are less soluble or less readily permeated through the membrane.

The permeation process may be conducted by contacting the feed hydrocarbon mixture in either the liquid or vapor state with the non-porous membrane and recovering permeated hydrocarbons from the opposite side of the membrane in either the liquid or vapor state. The permeated hydrocarbons should not be allowed to accumulate within the permeate zone to the extent that the concentration of the more readily permeatable hydrocarbons attain the same concentration in the medium of the permeate zone as they are present in the feed zone. To facilitate rapid permeation of hydrocarbons, the concentration of the permeated hydrocarbons at the surface of the membrane on the permeate side should be kept low by diluting permeated hydrocarbons in this zone with a diluent liquid or gas or by removing the permeated hydrocarbons. The diluent employed to reduce the concentration of permeated hydrocarbons in the permeate zone may be liquid or gaseous, depending upon the physical state of the permeated hydrocarbons, and should be separable from the permeated hydrocarbons by distillation or other means. Examples of diluents are steam, air, butane and the like. A good method of operating the permeation process consists of maintaining the hydrocarbon in the feed zone in the liquid phase and removing permeated hydrocarbons in the vapor phase from the permeate zone, using a gaseous sweep to assist in removing the permeated hydrocarbons from the permeate surface of the membrane.

The permeation process may be operated as a batch or continuous operation. When operating continuously, the feed hydrocarbon mixture may be continuously or intermittently introduced into the feed zone, and non-permeated and permeated hydrocarbons may be continuously or intermittently withdrawn separately from the feed and permeate zones respectively. The rate of introduction of the feed and the removal of non-permeated hydrocarbons may be adjusted to provide the desired amounts of permeated and non-permeated hydrocarbons. Of course, only a portion of the feed hydrocarbon mixture should be permeated or else no separation of the hydrocarbons will be obtained. A number of permeation stages may be employed. Permeated or non-permeated hydrocarbons may be recycled to the various zones. In each zone the membrane may be used in the form of sheeting or tubing or in any other manner which preferably provides a maximum amount of membrane surface to volume ratio.

In operating the permeation process the concentration of the preferentially permeatable hydrocarbon should be lower in the permeate zone than it is in the feed zone. When operating with gaseous phases on both sides of the membrane this may conveniently be accomplished by maintaining a higher absolute pressure in the feed zone than in the permeate zone. Pressure differentials of from 10 mm. Hg to as high as 100 p.s.i.g. or higher may be used, depending upon the strength of the membrane. The pressure in the particular zone may thus vary from subatmospheric to superatmospheric. It is preferred to maintain the permeate zone at subatmospheric pressures so that the permeated hydrocarbons may be easily evaporated from the permeate side of the membrane and removed from the permeate zone in the vapor state. When operating in accordance with the preferred technique of maintaining hydrocarbons in the liquid phase in the feed zone and hydrocarbons in the permeate zone in the vapor phase, the feed zone may suitably be maintained at atmospheric pressure or somewhat higher and the permeate zone may be maintained at a subatmospheric pressure so that permeated hydrocarbons are readily removed from the permeate side of the membrane and then removed from the permeate zone.

The membrane employed is non-porous, i.e. free from holes or other defects which destroy a continuous surface. If the membrane has pin holes or the like which allow hydrocarbons to leak through, the selectivity of the permeation process is reduced or eliminated. The membrane should be as thin as possible and yet retain sufficient strength and stability to be useful in the permeation process. Ordinarily, it may be from about 0.1 to 10 mils in thickness. Higher rates of permeation are obtained as the thickness of the membrane is decreased. Supports such as fine mesh wire screen, porous sintered metals or ceramic materials may be used as backing or supporting means to assist in minimizing the chances of rupturing the membrane while yet employing as thin a membrane as possible. The membrane must be one in which certain hydrocarbons are more soluble than others. The membrane must in a sense act as a selective solvent for certain of the hydrocarbons. Examples of such selective membranes are those comprised of natural or synthetic rubber such as gum rubber, chloroprene or neoprene rubber, vinyl polymers such as styrene polymer, polyisobutylene whose constituents have an average molecular weight higher than about 10,000, certain cellulose esters such as are described in detail on page 1, line 22 to page 4, line 17 of my copending application Serial No. 443,894 and claimed therein for this purpose, and certain cellulose ethers such as are described in detail on page 1, line 22 to page 4, line 19 of my copending application Serial No. 443,893 and claimed therein for this purpose of selectively permeating certain hydrocarbons. The preferred membrane is comprised of ethyl cellulose having an ethoxyl content between 40 to 47% by weight. A membrane comprised of cellulose acetate-butyrate having an acetyl content of about 5 to 15% and a butyryl content of 35 to 60% may also be used although much lower permeation rates are obtained. The membranes described supra are not necessarily equivalent to each other in regard to rate of permeation and selectivity, and it is only necessary that the membrane be capable of selective permeation.

The hydrocarbon mixture which may be employed as the feed to the permeation process is one which is comprised essentially of saturated hydrocarbons, although very small amounts of other hydrocarbons and/or impurities may be present therein. Various concentrations of particular saturated hydrocarbons, i.e. straight-chain or normal paraffins, cycloparaffins including alkyl cycloparaffins, and open-chain branched-chain paraffins may be contained in the feed saturated hydrocarbon mixture. Saturated hydrocarbons of differing molecular configuration will generally permeate more rapidly through the membrane in the following order: open-chain hydrocarbons having a high degree of branching, open-chain hydrocarbons having a lesser degree of branching, closed-chain hydrocarbons such as cycloparaffins and alkyl cycloparaffins, straight-chain or normal paraffins: A separation can also be made between hydrocarbons based upon their molecular weights, the lower molecular weight hydrocarbon generally permeating through the membrane more rapidly than the higher molecular weight hydrocarbon. A preferred feed hydrocarbon mixture is one which boils within the gasoline boiling range. The separation of hydrocarbons having differing molecular configurations is most advantageously performed upon a feed consisting of a narrow boiling mixture, e.g. boiling within a range of about 30° C., and preferably a narrow boiling mixture which boils within the gasoline boiling range. The feed hydrocarbon mixture may be a natural or synthetic mixture comprised essentially of saturated hydrocarbons. Thus saturated hydrocarbons boiling within the gasoline boiling range can be separated into higher and lower octane number fractions.

By contacting the membrane during the permeation process with an added hydrocarbon solvent for the membrane, the rate of permeation may be enormously increased without substantially altering the selectivity of the membrane or the separation factor. The hydrocarbon solvents for the membrane are aromatic hydrocarbons and unsaturated hydrocarbons. In general, hydrocarbon solvents having lower boiling points are preferred. Aromatic hydrocarbons such as benzene, toluene, ethylbenzene, xylenes, propylbenzenes, dimethylnaphthalenes, and the like may be employed. Benzene and toluene are the preferred aromatic hydrocarbon solvents. Of the unsaturated hydrocarbon solvents, those having the higher degree of unsaturation are more effective in improving the rate of hydrocarbon permeation. Also, the lower is the boiling point of the unsaturated hydrocarbon solvent the greater is its effect in improving the rate of permeation. Open-chain and closed-chain unsaturated hydrocarbon solvents may be employed. Examples of unsaturated hydrocarbon solvents are diolefins, including pentadienes such as isoprene, hexadienes, cyclodiolefins such as cyclohexadiene, cyclopentadiene, bicyclopentadiene, alkyl cyclodiolefins such as dimethylcyclohexadiene, monoolefins such as pentenes, hexenes, heptenes, octenes, cycloolefins and alkyl cycloolefins such as cyclohexene, methylcyclohexene, dimethylcyclopentene, and the like. The hydrocarbon solvent is advantageously one which has a boiling point different from that of the hydrocarbon feed mixture. This enables separation of the hydrocarbon solvent by distillation from the permeated and/or non-permeated hydrocarbons. The aromatic and unsaturated hydrocarbons have a solvent effect upon the membranes. In some unknown manner they function to facilitate the permeation of feed hydrocarbons through the membrane.

The solvent effect of the hydrocarbon solvent for the membrane can often be observed by contacting the membrane with varying concentrations of the hydrocarbon solvent in some inert medium such as heptane at varying temperatures. As the concentration of the hydrocarbon solvent is increased in the diluent n-heptane and as the temperature is increased, the membrane softens until it is severely softened, then gels, and finally completely dissolves in the solution of the hydrocarbon solvent. For example, if a membrane comprised of Hercules G–100 ethyl cellulose (having an ethoxyl content of 44.5–45.5%) is immersed in a mixture of 90% toluene and 10% n-heptane, the membrane becomes softened at 25° C., at 50° C. the membrane becomes a gelled mass, and at 70° C. the membrane is completely dissolved within the solution of the hydrocarbon solvent in heptane. The effect of the concentration of the hydrocarbon solvent toluene in the diluent n-heptane at a constant temperature of 70° C. has also been observed. As the concentration of toluene reaches 30% G–100 ethyl cellulose membrane begins to soften until at about 60 to 70% toluene it is severely softened, as the concentration is increased to about 80% the membrane becomes gelled, and at a concentration higher than about 90% toluene in n-heptane the membrane is completely dissolved. Dimethylnaphthalene has approximately the same solvent power on the Hercules G–100 ethyl cellulose membrane. Ethyl cellulose membranes having a higher ethoxyl content are more easily dissolved by the hydrocarbon solvent and therefore lowered temperatures and/or concentrations of the hydrocarbon solvent which is in contact with the membrane must be employed. Conversely, ethyl cellulose membranes having a lower ethoxyl content are more stable toward the hydrocarbon solvent and higher concentrations of the solvent in contact with the membrane may be employed or higher temperatures may be used. Cellulose acetate-butyrate having a butyryl content of about 48% and an acetyl content of about 7% has approximately the same stability as G–100 ethyl cellulose. Cellulose acetate-butyrate of higher acetyl content and lower butyryl content is even more stable toward the hydrocarbon solvent, whereas if the butyryl content is increased and the acetyl content is decreased the membrane becomes less stable toward the hydrocarbon solvent. At the time that the membrane dissolves the solvent, frequently it can be observed that the membrane swells. At this stage it is believed that the full effect of the hydrocarbon solvent for increasing the permeation rate of the membrane has been achieved. Increasing the temperature of the permeation process or increasing the concentration of the solvent in the medium in contact wtih the membrane may not substantially improve the rate of permeation through the membrane, but it will greatly increase the possibility of the membrane rupturing.

The temperature at which the permeation process may be operated in the presence of the hydrocarbon solvent will be somewhat lower than is employed when operating in the absence of the hydrocarbon solvent for the membrane. It may vary between 0 to 250° C., depending of course upon the particular membrane used, the particular hydrocarbon solvent employed, and the concentration of the hydrocarbon solvent in the liquid phase which is in contact with the membrane. The concentration of the hydrocarbon solvent medium in contact with the membrane is relatively unimportant when vapors of the solvent are in contact with the membrane, whereas it assumes greater importance when the hydrocarbon solvent in the liquid phase contacts the membrane. The amount of hydrocarbon solvent which may be employed will vary from about 5 to 100% by concentration based upon the total hydrocarbons present in the zone to which the hydrocarbon solvent is added. Generally, higher concentrations of the hydrocarbon solvent will cause a greater improvement in the rate of permeation up to about the point where the membrane becomes distinctly softened. Higher concentrations than that necessary to soften or cause swelling of the membrane may not materially improve the permeation rate, but increase the possibility of weakening the membrane to the point of rupture. The particular temperature and concentration of the hydrocarbon solvent in the liquid phase in contact with the membrane can readily be determined for the particular membrane to be used by a few simple tests such as were discussed in the preceding paragraph.

When operating the permeation process with a hydrocarbon solvent for the membrane, the hydrocarbon solvent may be present in either the feed zone or the permeate zone in either the liquid or gaseous phase. Generally, the physical state of the hydrocarbon solvent should be the same as for the other hydrocarbons present in the zone to which the hydrocarbon solvent is added. It is preferred to add the hydrocarbon solvent to the feed zone either by separate introduction or introducing along with the feed hydrocarbon mixture. A desirable method of operating consists of maintaining the feed hydrocarbon mixture and added hydrocarbon solvent in the liquid phase in the feed zone and recovering permeated hydrocarbons and permeated hydrocarbon solvent in the vapor phase in the permeate zone. By employing a hydrocarbon solvent having a different boiling point than the constituents of the hydrocarbon feed mixture, the hydrocarbon solvent can then be separated from the permeated and/or non-permeated hydrocarbons and recovered therefrom and reused. In multi-stage operations wherein either the permeated hydrocarbons or the non-permeated hydrocarbons are sent to subsequent or previous permeation stages it is often desirable to allow the hydrocarbon solvent to remain in the fraction which is sent to a subsequent or previous permeation stage.

A number of experiments were performed which demonstrate the effectiveness of the hydrocarbon solvent in improving the rate of permeation of a mixture of saturated hydrocarbons through non-porous selective membranes. In these experiments a permeation cell, whose construction and manner of operation is described in detail in my copending application Serial No. 443,894 (page 15, line 9 to page 16, line 25), was used. The apparatus comprised a chamber in which was suspended a box-like membrane holder. The total amount of membrane surface effective for permeation was 22 square inches. The membrane holder had 5 open faces which were tightly covered (leak proof) with the membrane. The chamber functioned as the feed zone and it had provisions for introducing and withdrawing feed and non-permeated hydrocarbons, respectively. The interior of the box-like membrane holder functioned as the permeate zone and is connected with a line for withdrawing permeated hydrocarbons and recovering the same. The permeate zone was sealed off from the feed zone so that no hydrocarbons could enter the permeate zone except by permeating the membrane. Provisions were made in the apparatus for sweeping the permeate surface of the membrane with a sweep gas. Pumps were so associated with the apparatus that any range of pressures from subatmospheric to atmospheric could be maintained in either the feed zone or the permeate zone.

The permeation cell was employed to separate mixtures of n-heptane and isooctane containing toluene as the added hydrocarbon solvent in a concentration varying from 0% to 40%. The membrane employed was Cellulose AB–500–5 (cellulose acetate-butyrate having an acetyl content of about 7% and a butyryl content of about 48%). The membrane was about 1.5 mils in thickness. A permeation temperature of approximately 70° C. was maintained. A pressure differential of about 730 mm. Hg was maintained across the membrane, the absolute pressure in the permeate zone being about 35 mm. Hg and the absolute pressure in the feed zone being about 760 mm. Hg. The total amount of hydrocarbons, including the hydrocarbon solvent toluene, which was introduced into the feed zone was approximately 1200 to 1400 ml. in each run. The various mixture employed in each run were permeated through the membrane until approximately a steady rate of permeation had been attained, usually between 2 to 6 hours. The total amount of permeated hydrocarbons, including the permeated hydrocarbon solvent, varied from about 9 to 40 ml. depending to some extent upon the rate of permeation. The permeated hydrocarbons in the permeate zone were maintained in the vapor phase and gaseous butane at the rate of 20 liters per hour was employed to sweep permeated hydrocarbons from the permeate surface of the membrane. Table I below sets forth the data which were so obtained.

Table I

| Run No. | Charge, Volume, Percent | | | Permeate, Volume Percent | | | | Rate of Permeation[1] (Toluene-Free Basis) |
|---|---|---|---|---|---|---|---|---|
| | Tol. | n-Hept. | Isooct. | Tol. | n-Hept. | Isooct. | n-Hept. (Tol.-Free) | |
| 1 | none | 50 | 50 | none | 79 | 21 | 79 | 0.4 |
| 2 | 8 | 45 | 47 | 26 | 58 | 16 | 80 | 1.6 |
| 3 | 16 | 33 | 51 | 43 | 40 | 17 | 70 | 3.6 |
| 4 | 16 | 41 | 43 | 39 | 47 | 14 | 77 | 6.4 |
| 5 | 25 | 37 | 38 | 49 | 38 | 13 | 75 | 8.5 |

[1] Gallons/hr/1000 sq. ft. of membrane surface.

The results obtained in the various runs shown above in Table I show that as the concentration of the hydrocarbon solvent toluene in the feed or charge zone is increased, the rate of permeation of the hydrocarbon increases. Although the rate of permeation is increased there is only a very small drop in the selectivity which the membrane displays for n-heptane. By the addition of only 8% toluene to the feed hydrocarbon mixture, the rate of permeation of the feed hydrocarbons (calculated on a toluene-free basis) through the membrane is quadrupled. When the hydrocarbon solvent toluene is added to the initial feed hydrocarbon mixture so that it is present therein in a concentration of 25% by volume, the rate of permeation of the initial hydrocarbon feed mixture (calculated on a toluene-free basis) is increased by a remarkable 20-fold. An attempt to employ toluene at a concentration of 40% by volume in admixture with n-heptane and isooctane resulted in rupturing of the membrane.

Additional experiments were conducted with the apparatus previously described. The experiments were performed in the same manner as those used in obtaining the data shown in Table I, except that a permeation temperature of 90° C. was employed and a membrane of 1.2 mils thickness comprised of Hercules G–100 Ethocel (ethyl cellulose having an ethoxyl content of 44.5–45.5%) was used. The results which were obtained when permeating the mixture of normal heptane and isooctane in the presence of added toluene as a hydrocarbon solvent for the membrane are shown in Table II which follows.

Table II

| Run No. | Charge, Volume Percent | | | Permeate, Volume Percent | | | | Rate of Permeation[1] (Toluene-Free) |
|---|---|---|---|---|---|---|---|---|
| | Tol. | n-Hept. | Isooct. | Tol. | n-Hept. | Isooct. | n-Hept. (Tol.-Free) | |
| 6 | none | 50 | 50 | none | 75 | 25 | 75 | 82 |
| 7 | 34 | 32 | 34 | 45 | 35 | 20 | 64 | 170 |

[1] Gallons/hr./1000 sq. ft. of membrane surface.

It can be seen that the rate of permeation is greatly improved by adding the hydrocarbon solvent to the initial mixture of saturated hydrocarbons so that the hydrocarbon solvent contacts the membrane during the permeation process. Such improvements in the rate of permeation render the separation of hydrocarbons by a permeation process much more attractive from an economic viewpoint.

Hydrocarbon solvents have also been employed in experiments to improve the rate of selective permeation of methylcyclohexane from an admixture of the latter with isooctane using a Cellulose AB–381 membrane (cellulose acetate-butyrate having an acetyl content of about 13% and a butyryl content of about 38%). The same membrane was employed for selectively permeating normal heptane from an admixture thereof with isooctane. In this latter series of experiments toluene and xylenes were employed as the hydrocarbon solvent added to the initial feed mixture of n-heptane and isooctane, and both the hydrocarbons in the feed zone and in the permeate zone were maintained in the vapor phase. Other experiments showed that the presence of toluene in the liquid feed hydrocarbon mixture would cause an increase in the permeation rate of normal heptane through a neoprene membrane. The permeation rates through neoprene were increased by 5–10-fold.

The invention will be more clearly understood by reference to the following specific example illustrated in the annexed drawing which forms a part of this specification and shows in schematic form one embodiment of the process of this invention for separating a mixture comprised of saturated hydrocarbons of differing molecular configuration into fractions enriched in hydrocarbons of a particular molecular configuration.

The feed employed in this illustration is comprised essentially of an equal volume mixture of n-heptane and isooctane. It is passed from source 11 at a temperature of about 70° C. by way of valved line 12 into the feed zone 13 of the first permeation stage. The hydrocarbon solvent for the membrane, in this illustration benzene, is passed from source 14 by way of valved line 16 and at a temperature of about 70° C. into valved line 12 wherein it mingles with the saturated hydrocarbon feed and passes into feed zone 13 of the first permeation stage. A temperature of 70° C. is maintained in each permeation stage. As illustrated diagrammatically herein the permeation stage consists of a vessel 17 which is divided by a non-porous membrane 18 to form two vertical sections, one being the permeate zone 19. The non-porous membrane which is employed in each of the three stages of the embodiment described is comprised of Hercules Ethocel G-100 which is an ethyl cellulose membrane having an ethoxyl content of 44.5–45.5%. The thickness of the membrane used is 1.5 mils. Although not illustrated, each permeation stage may be comprised of a great number of individual permeation cells, each cell consisting of a feed zone separated by a non-porous membrane from a permeate zone. The particular form of apparatus used in each permeation stage may be widely varied and constitutes no part of this invention. Likewise, the membrane may be one which is supported in some manner to diminish the possibility of membrane ruptures. The concentration of benzene in the mixture of normal heptane and isooctane entering each stage is maintained at about 33% by volume. The feed zones of each permeation stage are maintained under a super-atmospheric pressure of 30 p.s.i.a. Under these conditions, the hydrocarbons in the feed zone are maintained in the liquid phase. The pressures maintained in the permeate zone of each permeation stage is about 100 mm. Hg abs. For purpose of clarity, the numerous pumps and other equipment necessary to maintain such conditions of pressure are not detailed herein. The mixture of benzene, normal heptane and isooctane is introduced into the feed zone of each permeation stage at a rate such that approximately ⅔ of the introduced hydrocarbons permeate the membrane and about ⅓ of the total hydrocarbons fed into each feed zone are removed as non-permeated hydrocarbons. Greater or lesser amounts of the introduced hydrocarbons may be allowed to permeate the membrane in each stage. Although not critically necessary, a sweep gas is employed in this illustration to assist in removing permeated hydrocarbons from the permeate side of the membrane. Butane from source 21 is admitted as a gas by way of valved line 22 into permeate zone 19 for this purpose.

The non-permeated hydrocarbons are removed from the first stage and passed by way of valved line 23 into feed zone 24 of the second permeation stage. This non-permeated fraction is enriched in isooctane and is depleted in normal heptane. It is also depleted in benzene. The permeated hydrocarbons together with the sweep gas butane are removed from permeate zone 19 and passed by way of line 26 to cooler 27. The hydrocarbons are then passed by way of line 28 into fractionator 29 wherein an overhead gaseous butane stream is separated and recycled by way of line 31 for use as the sweep gas in the various permeate zones. Benzene which tends to concentrate in the permeate fraction is also separated in fractionator 29 and is removed as a side-stream by way of line 32. It is then passed to condenser 33 and recycled by way of line 34 as the hydrocarbon solvent for the membrane used in the feed zones of the various permeation stages. A liquid bottoms fraction is removed from fractionator 29 by way of line 36. This liquid mixture is partially concentrated n-heptane containing a small proportion of isooctane. Additional benzene is added to the mixture in valved line 23 so that the concentration of benzene is 33% by volume in the three component hydrocarbon mixture entering feed zone 24 of the second permeation stage. The benzene introduced may be that introduced from source 14 by means not shown, or as in this illustration it may be benzene which has been recovered from the permeate fraction of the first permeation stage which is being cycled by way of line 34. Valved line 37 is employed to carry the additional amount of benzene needed from line 34 to line 23.

The non-permeated hydrocarbon mixture, which has become further depleted in n-heptane and benzene, is removed from feed zone 24 of the second permeation stage and is passed by way of valved line 38 into the feed zone of the third permeation stage. Recycled butane sweep gas is admitted from the butane recycling line 31 and is passed by way of valved line 39 into the permeate zone 41 of the second permeation stage. The permeated hydrocarbons together with the sweep gas butane are removed from permeate zone 41 and passed by way of line 42 to cooler 43. The hydrocarbons are compressed by means not shown and passed by way of line 44 into stabilizer 46. Gaseous butane is recovered overhead from stabilizer 46 and is passed by way of line 47 into the main butane recycling line 31. A liquid fraction containing in the neighborhood of about 50% benzene and the remainder consisting of about equal portions of normal heptane and isooctane is recovered and is passed by way of line 48 into line 12 for the recovery of further amounts of the isooctane still remaining. Certain permeated hydrocarbons, after removal of sweep gas butane, can be recycled as a portion of the feed to the feed zone of previous permeation stages if the concentration of the hydrocarbons in the permeate fraction is approximately the same as that entering the feed zone of the earlier permeation stage. This enables a more complete recovery of the desired isooctane.

The non-permeated hydrocarbons removed from feed zone 24 of the second permeation stage, are passed by way of valved line 38 into permeation zone 49 of the third permeation stage. These non-permeated hydrocarbons have become enriched in isooctane and depleted in normal heptane and benzene. Additional benzene is added to valved line 38 to increase the concentration of benzene in the hydrocarbons entering feed zone 49 to about 33%. As illustrated here, the benzene is admitted from line 34, which carries recycled benzene, by way of valved line 51 into valved line 38. Butane sweep gas is admitted from line 31 by way of valved line 52 into permeate zone 53 of the third permeation stage. The permeated hydrocarbons together with butane are removed from permeate zone 53 and passed by way of line 54 into cooler 56. The cooled hydrocarbons are then compressed and sent by way of line 57 to stabilizer 58. Gaseous butane is removed overhead from stabilizer 58 and passed by way of line 59 into the butane recycling line 31 for reuse. A liquid bottoms fraction is removed from stabilizer 58 and is passed by way of line 61 into valved line 23. This liquid hydrocarbon mixture is enriched in isooctane and benzene and constitutes a valuable stream for recycle to the feed zone of the second permeation stage as illustrated herein.

The non-permeated hydrocarbons are removed from feed zone 49 and passed by way of valved line 62 into fractionator 63. This non-permeated fraction consists mostly of isooctane with only a small amount of benzene and normal heptane. Benzene is separated from this mixture and taken overhead and passed by way of line 64 into benzene recycling line 34. A highly concentrated isooctane fraction containing only a very small amount of normal heptane is recovered from fractionator 63 and is removed as a liquid bottoms product by way of line 66. This highly concentrated isooctane fraction is an excellent motor fuel or motor fuel blending agent. The concentrated normal heptane recovered from the system by way of line 36 provides a suitable feed material for aromatization to a higher octane number motor fuel. By means of this invention a highly efficient and rapid selective permeation of saturated hydrocarbons is obtainable.

The use of substituted hydrocarbon solvents such as oxygen-containing organic compounds e.g. acetone, methyl ethyl ketone, butanol; organic halogen compounds such as ethylene dichloride, carbon tetrachloride, ethylene dibromide; sulfur-containing organic compounds such as propyl mercaptan, diethyl sulfide; and nitrogen-containing organic compounds such is nitropropane and nitrobenzene for improving the permeation rate of hydrocarbons through selective non-porous membranes is the subject matter of copending application Serial No. 465,497, filed on even date herewith, now Patent No. 2,947,687.

Thus having described the invention what is claimed is:

1. In the process of separating a mixture of at least two saturated hydrocarbons by introducing said mixture into the feed zone of a permeation apparatus comprised of a feed zone which is sealed from a permeate zone by a thin plastic membrane in which one of the hydrocarbons contained in said mixture of saturated hydrocarbons is more soluble than others, in which process a portion of said mixture of saturated hydrocarbons is permeated through said membrane into the permeate zone and the permeated portion is withdrawn from said permeate zone and a non-permeated portion is withdrawn from the feed zone, said permeated portion being enriched in the saturated hydrocarbon which is more soluble in the membrane, the improvement which comprises increasing the rate of permeation of hydrocarbons through the membrane by contacting the membrane during permeation with an added hydrocarbon solvent for said membrane, said membrane solvent being selected from the group consisting of aromatic hydrocarbons, unsaturated hydrocarbons, and mixtures thereof, and said hydrocarbon solvent being in addition to any hydrocarbons originally occurring in the feed mixture and to any recycle hydrocarbons derived from the feed mixture, and carrying out the permeation in the presence of said hydrocarbon solvent in an amount of the latter sufficient to substantially increase the rate of permeation of saturated hydrocarbons through said permeation membrane.

2. In the process of separating a mixture of at least two saturated hydrocarbons by introducing said mixture into the feed zone of a permeation apparatus comprised of a feed zone which is sealed from a permeate zone by a thin plastic membrane in which one of the hydrocarbons contained in said mixture of saturated hydrocarbons is more soluble than others, in which process a portion of said mixture of saturated hydrocarbons is permeated through said membrane into the permeate zone and the permeated portion is withdrawn from said permeate zone and a non-permeated portion is withdrawn from the feed zone, said permeated portion being enriched in the saturated hydrocarbon which is more soluble in the membrane, the improvement which comprises increasing the rate of permeation of hydrocarbons through the non-porous membrane by introducing into the feed zone both the hydrocarbon feed mixture and a hydrocarbon solvent for said membrane, said membrane solvent being selected from the group consisting of aromatic hydrocarbons, unsaturated hydrocarbons, and mixtures thereof, and said hydrocarbon solvent being in addition to any hydrocarbons originally occurring in the feed mixture and to any recycle hydrocarbons derived from the feed mixture, and carrying out the permeation in the presence of said hydrocarbon solvent in an amount of the latter sufficient to substantially increase the rate of permeation of saturated hydrocarbons through said permeation membrane, and thereafter separating said hydrocarbon solvent from the permeated saturated hydrocarbons.

3. The process of claim 2 wherein the hydrocarbon solvent is separable by distillation from the saturated hydrocarbons contained in said permeated saturated hydrocarbons.

4. The process of claim 2 wherein the feed mixture of saturated hydrocarbons is comprised essentially of a narrow boiling mixture of aliphatic hydrocarbons.

5. The process of claim 2 wherein the feed mixture of saturated hydrocarbons and the introduced hydrocarbon solvent are maintained in the liquid state in the feed zone and the permeated portions are withdrawn in the vapor state from the permeate zone.

6. The process of claim 2 wherein the mixture of saturated hydrocarbon boils within the gasoline boiling range.

7. The process of claim 2 wherein said hydrocarbon solvent is a low boiling mononuclear aromatic hydrocarbon.

8. In the process of separating a mixture of at least two saturated hydrocarbons, said mixture being a narrow boiling mixture which boils within the gasoline boiling range, by introducing said mixture into the feed zone of a permeation apparatus comprised of a feed zone which is sealed from a permeate zone by a thin plastic membrane in which one of the hydrocarbons contained in said mixture of saturated hydrocarbons is more soluble than others, in which process the mixture of saturated hydrocarbons in the feed zone is maintained in the liquid state and a portion of the mixture of hydrocarbons in the feed zone is permeated through said membrane into the permeate zone and the permeated portion is withdrawn in the vapor state from said permeate zone and a non-permeated portion is withdrawn from the feed zone, said permeated portion being enriched in the saturated hydrocarbon which is more soluble in the membrane, the improvement which comprises increasing the rate of permeation of saturated hydrocarbons through the membrane by introducing into the feed zone both the hydrocarbon feed mixture and a liquid aromatic hydrocarbon solvent for said membrane, said hydrocarbon solvent being in addition to any hydrocarbons originally occurring in the feed mixture and to any recycle hydrocarbons derived from the feed mixture, carrying out the permeation in the presence of said aromatic hydrocarbon solvent for said membrane in an amount of the latter sufficient to substantially increase the rate of permeation of saturated hydrocarbons through said permeation membrane, and thereafter separating said aromatic hydrocarbon solvent by distillation from the permeated saturated hydrocarbons.

9. The process of claim 8 which includes the step of recycling to the feed zone aromatic hydrocarbon membrane solvent separated by distillation from the permeated saturated hydrocarbons.

10. In the process of separating a mixture of at least two saturated hydrocarbons, said mixture having a narrow boiling range within the gasoline boiling range, by introducing said mixture into a feed zone of a permeation stage comprised of a feed zone which is sealed from a permeate zone by a thin plastic membrane in which one of the saturated hydrocarbons contained in said mixture is more soluble than another, in which process the mixture of saturated hydrocarbons is maintained in the liquid state within said feed zone and a portion of the mixture of hydrocarbons in the feed zone is permeated through said membrane into the permeate zone and the permeated portion is withdrawn from said permeate zone in the vapor state and a non-permeated portion is withdrawn from the feed zone in the liquid state, said permeated portion being enriched in the saturated hydrocarbon which is more soluble in the membrane, the improvement which comprises increasing the rate of permeation of the saturated hydrocarbon through the membrane by introducing into the feed zone both the hydrocarbon feed mixture and a liquid aromatic hydrocarbon solvent for said membrane, said membrane solvent being of a hydrocarbon type distinguishable from the saturated hydrocarbon being more soluble in said membrane and said membrane solvent being in addition to any hydrocarbons originally occurring in the feed mixture and to any recycle hydrocarbons derived from the feed mixture, carrying out the permeation in the presence of said aromatic hydrocarbon membrane solvent in an amount of the latter sufficient to substantially increase the rate of permeation of the saturated hydrocarbon through said permeation membrane, separating said aromatic hydrocarbon solvent by distillation from the permeated saturated hydrocarbons, recycling to the feed zone separated aromatic hydrocarbon membrane solvent, and recycling to said permeate zone at least a portion of the permeated saturated hydrocarbon from which the recycled aromatic hydrocarbon membrane solvent has been separated by distillation.

References Cited in the file of this patent

UNITED STATES PATENTS

| | | |
|---|---|---|
| 2,159,434 | Frey | May 23, 1939 |
| 2,475,990 | Robertson | July 12, 1949 |

FOREIGN PATENTS

| | | |
|---|---|---|
| 355,294 | Great Britain | Aug. 21, 1931 |
| 445,345 | Great Britain | Sept. 30, 1935 |

OTHER REFERENCES

American Dyestuff Reporter for June 11, 1951, page 387.

Modern Plastics for June 1950, pages 97, 98, 100, 102, 150–152, 154, 156, 158 (article by V. L. Simril and A. Hershberger).

Modern Plastics for June 1951, page 107.

"Technique of Organic Chemistry, vol. III, Pt. I; Separation and Purification" by Arnold Weissberger. First ed.; published by Interscience Publishers, 1956, pages 41–47.